May 1, 1973  D. W. McKEE ET AL  3,730,774
AMMONIA FUEL CELL WITH IRIDIUM CATALYST AND
METHOD OF USING THE CELL

Filed June 1, 1967  2 Sheets-Sheet 1

Inventors:
Douglas W. McKee;
Anthony J. Scarpellino, Jr.,
by Paul R. Webb, II
Their Attorney.

Inventors:
Douglas W. McKee;
Anthony J. Scarpellino, Jr.,
by Paul R. Webb, II
Their Attorney.

United States Patent Office 3,730,774
Patented May 1, 1973

3,730,774
AMMONIA FUEL CELL WITH IRIDIUM CATALYST AND METHOD OF USING THE CELL
Douglas W. McKee, Burnt Hills, and Anthony J. Scarpellino, Jr., Glens Falls, N.Y., assignors to General Electric Company
Filed June 1, 1967, Ser. No. 642,947
Int. Cl. H01m 27/30
U.S. Cl. 136—86 R 3 Claims

ABSTRACT OF THE DISCLOSURE

A fuel cell has a catalyst material of iridium or an iridium alloy in the anode chamber and heating means associated with the chamber whereby ammonia vapor, which is fed to the chamber, is dissociated into its constituents, nitrogen and hydrogen. The dissociated gases are supplied to the anode as fuel. A hydrogen permeable membrane can also be employed between the catalyst material and the anode whereby hydrogen is supplied to the anode as fuel. A wide variety of electrodes and electrolyte are suitable in the fuel cell.

---

This invention relates to fuel cells and, more particularly, to fuel cells wherein a catalyst material of iridium or an iridium alloy is contained in the anode chamber and heating means are associated with the chamber for dissociating ammonia vapor into hydrogen and nitrogen which is employed as the fuel or the hydrogen is diffused through a hydrogen permeable membrane and used as the fuel.

As it is well known, fuel cells are devices capable of generating electricity by electrochemically combining an oxidizable reactant, termed a fuel, and a reducible reactant, termed an oxidant. The reactants are fluids, either liquids or gases, and usually fed continuously to the cell from separate external sources. The fuel cell itself is comprised of spaced electrodes ionically connected by an electrolyte. It is a characteristic of fuel cells that the electrodes and electrolyte remain substantially chemically invariant in use.

Each electrode is electronically conductive, adsorbs the fuel or oxidant employed, presents an active material for the electrode reaction, and does not oxidize unduly under the operating conditions of the cell. When fuel and oxidant are concurrently and separately supplied to the different electrodes of the fuel cell, an electrical potential will develop across the electrodes. When an electrical load is provided across the electrodes, an electrical current flows therebetween, the electrical energy thus represented being generated by the electrocatalytic oxidation of fuel at one electrode and the simultaneous electrocatalytic reduction of oxidant at the other.

In the copending patent application of Douglas W. McKee, Ser. No. 642,937, filed concurrently herewith, now abandoned, there is disclosed and claimed an ammonia dissociator and method of dissociating ammonia wherein an improved catalyst material is employed which is selected from the class consisting of iridium and iridium alloys. The above copending application is assigned to the same assignee as the present application.

Our present invention is directed to an improved fuel cell which has a catalyst material of iridium or an iridium alloy positioned within the anode chamber and heating means associated with the chamber whereby ammonia vapor supplied to the cell is dissociated into constituent gases. These gases are employed as the fuel or hydrogen is diffused therefrom and used as the fuel. Thus, it is a primary object of our invention to provide a fuel cell wherein inexpensive ammonia vapor can be used as a source of fuel for the cell.

It is another object of our invention to provide such a fuel cell wherein hydrogen is diffused from the dissociated gases of ammonia in the anode chamber thereby improving the performance of the cell.

It is a further object of our invention to provide such a fuel cell wherein the dissociation is accomplished by a catalyst material of iridium or an iridium alloy.

In accordance with our invention, a fuel cell is formed with a cathode chamber, a cathode within the chamber, an oxidant supply for the cathode chamber, an electrolyte, an anode chamber, an anode within the anode chamber, one surface of both the cathode and anode in contact with the electrolyte, an ammonia fuel supply for the anode chamber, a catalyst material positioned within the anode chamber, the catalyst material selected from the class consisting of iridium and iridium alloys, and heating means for the anode chamber.

These and various other objects, features and advantages of the invention will be better understood from the following description taken in connection with the accompanying drawing in which.

Figure 1:
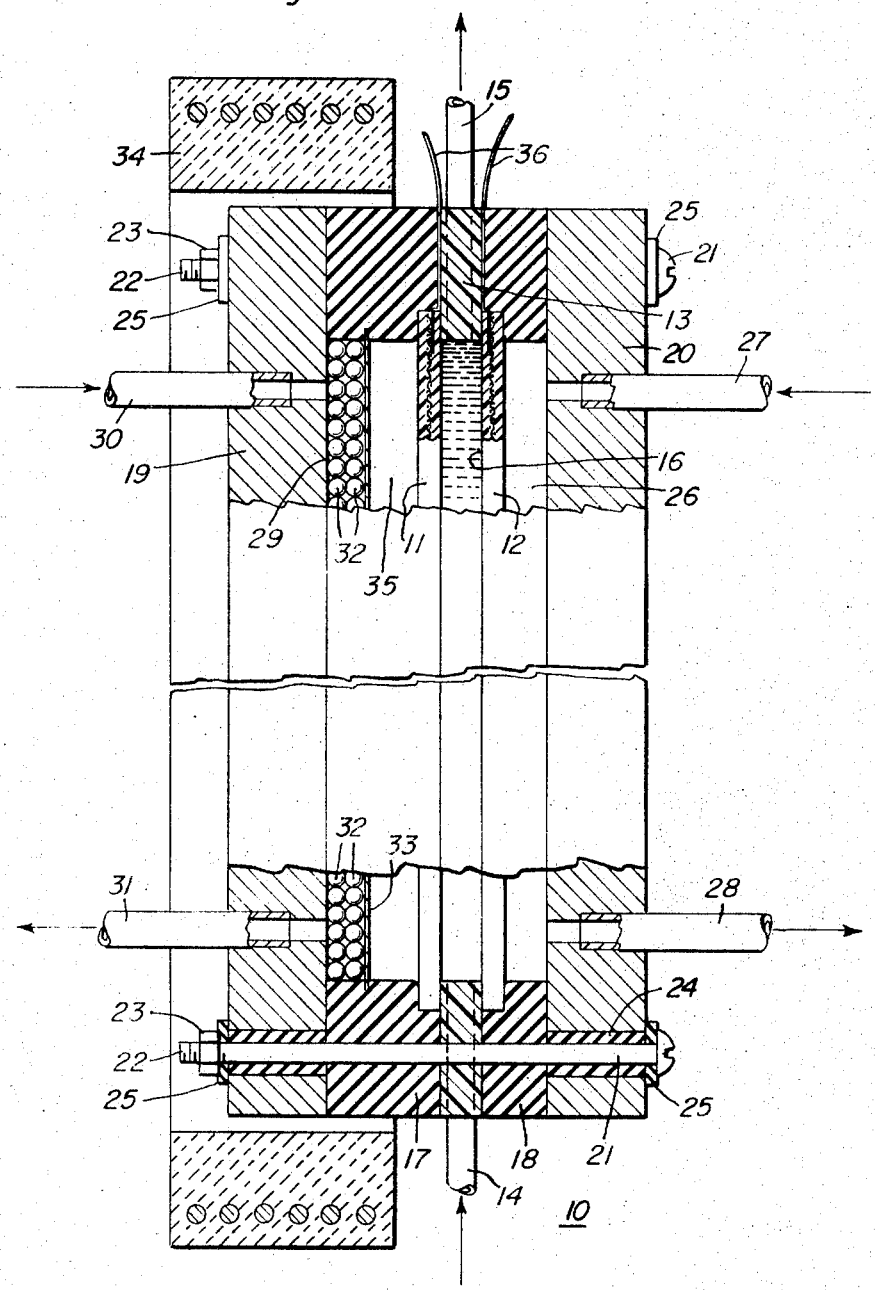
FIG. 1 is a sectional view of a fuel cell made in accordance with our invention.

In FIG. 1 of the drawing, there is shown generally at 10 a fuel cell embodying our invention which comprises an anode 11 and a cathode 12, separated by an annular electrolyte gasket 13. Electrolyte inlet conduit 14 and electrolyte outlet conduit 15 are sealingly related to the electrolyte gasket to circulate a free aqueous electrolyte to and from electrolyte chamber 16 formed by the anode, cathode and gasket. An anode gasket 17 and a cathode gasket 18 are positioned adjacent opposite faces of the electrolyte gasket to seal therewith and to hold the anode and cathode in assembled relation. Identical end plates 19 and 20 are associated with the anode and cathode gaskets, respectively, in sealing relation therewith. To hold the gaskets and end plates in assembled relation, a plurality of tie bolts 21 are provided, each having a threaded end 22 and a nut 23 mounted thereon. To insure against any possibility of internal short circuiting of the fuel cell electrodes, the tie bolts are provided with insulative bushings 24 within each end plate and with an insulative washer 25 adjacent each terminus.

An oxidant or cathode chamber 26 is formed by the cathode gasket, cathode and end plate 20. An oxidant inlet conduit 27 is sealingly associated with the end plate to allow oxidant to be fed to the oxidant chamber while an oxidant outlet conduit 28, which is optional, is similarly associated with the end plate to allow the purge of oxidant. It is recognized that where the fuel cell is to be operated on ambient air it is unnecessary that the fuel cell include any conduits or other means for delivering oxidant to the cathode.

The anode, anode gasket and end plate 19 similarly cooperate to form an anode or fuel chamber 29. A fuel inlet conduit 30 is shown for providing ammonia vapor to anode chamber 29 from an ammonia source (not shown). A fuel outlet conduit 31 is also shown. Catalyst material 32 is positioned within anode chamber 29 and spaced from anode 11 by a gas permeable spacer 33 held in position by anode gasket 17. Catalyst material 32 is shown in the form of alumina pellets with iridium dispersed thereon. Spacer 33 is shown in the form of a palladium-silver foil which is a nonporous hydrogen diffusion membrane at elevated temperatures. Such a membrane is discussed for example in "Nonporous Hydrogen Depolarized Anode for Fuel Cells" by H. G. Oswin et al. in "Fuel Cell Systems," American Chemical Society, Washington, D.C., 1965, at p. 61–72. Heating means are provided for anode chamber 29 and shown in the form of an associated resistance furnace 34. A portion 35 of anode chamber 29 provides additional spacing of catalyst material 32 from anode 11. This spacing is desirable since high temperatures are required with the supported catalysts to dissociate ammonia vapor admitted to the anode chamber. A pair of electrical leads 36 are shown extending outwardly from cell 10, which leads are connected to anode 11 and cathode 12, respectively.

Figure 2:
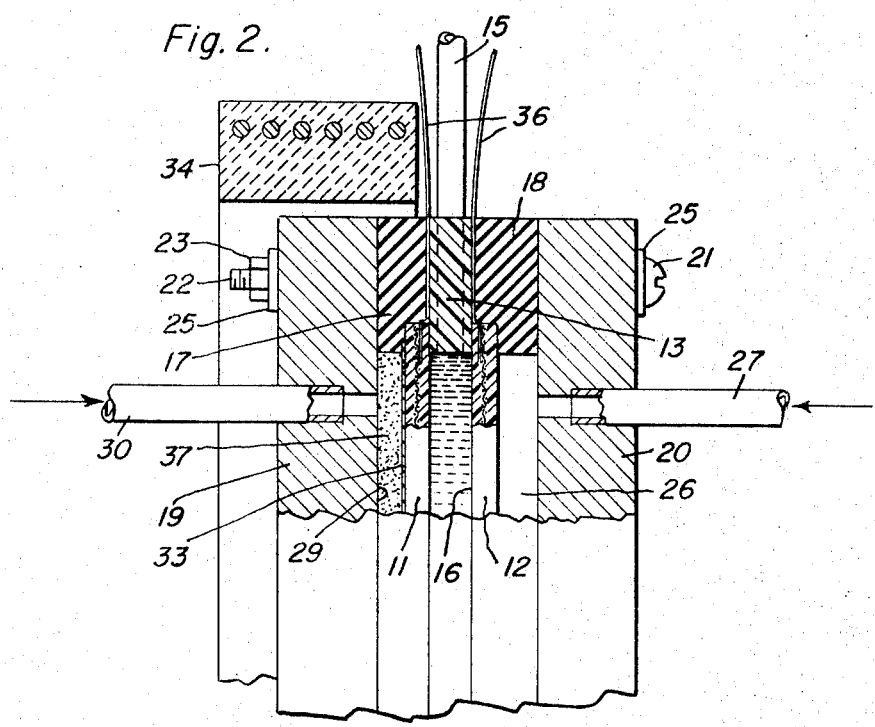
FIG. 2 is a sectional view of a portion of a modified fuel cell made in accordance with our invention.

In FIG. 2 of the drawing, there is shown a portion of a modified fuel cell embodying our invention. The cell in FIG. 2 is constructed as in FIG. 1 with the exception of the anode chamber 29. Catalyst material 37 of iridium black is positioned within anode chamber 29 by being packed tightly between end plate 19 and foil 33. If desired, a screen is positioned over the inlet and outlet conduits 30 and 31 to prevent possible loss of catalyst material 37.

We found unexpectedly that a fuel cell can be formed wherein inexpensive ammonia vapor supplied thereto can be dissociated within the anode chamber to produce dissociated gases with a high hydrogen concentration which is employed as the fuel or the hydrogen can be diffused therefrom for the fuel. The construction of the fuel cell including the type of electrode and electrolyte can vary widely. We found that the catalyst material should be positioned within the anode chamber and preferably spaced from the anode. The catalyst material is selected from the class consisting of iridium and iridium alloys. Suitable iridium alloys include platinum-iridium, iridium-titanium, iridium-tantalum, iridium-iron, iridium-nickel, etc. The catalyst material can be supported or unsupported and can be provided in various configurations. The catalyst materials are useable in powder form, or in various configurations such as rods, balls, wire or screen. Suitable support materials include non-metallic types of carbon, silica, pumice, zeolite, etc., and various metallic substrate materials. The gas permeable spacer can be formed from a wide variety of metallic and non-metallic material in various configurations. The spacer, which can also preferentially diffuse hydrogen, includes materials such as palladium-silver foil and silicone sheet. Additionally, the iridium black can be bonded to the spacer by chemical deposition, electrochemical plating, or evaporation under vacuum conditions.

When the catalyst material is used in powder form substantially lower temperatures are suitable for dissociating ammonia vapor to dissociated gases including as its principal constituent, hydrogen. When the catalyst material is dispersed on a substrate a lower loading of catalyst material is present. While the supported catalyst is less expensive, it requires higher operating temperatures to dissociate the ammonia vapor.

We found further that while the catalyst material is effective when positioned in contact with the anode, it is preferred to space the catalyst material from the anode to avoid wetting the catalyst with electrolyte. However, since the cell operates more effectively when the catalyst material is positioned in close proximity to the anode, a gas permeable spacer is positioned adjacent the anode to space the catalyst material from the anode. The cell performance is improved further when only the hydrogen from the dissociated gases is supplied to the anode. Thus, we found further that we can space the catalyst material from the anode thereby avoiding the wetting problem and further improving the cell by supplying only hydrogen from the dissociated gases to the anode by employing a hydrogen diffusion membrane, for example, in the form of a palladium-silver foil as the spacer.

When the catalyst material is employed in powder form, the hydrogen diffusion membrane is positioned adjacent the anode and the powder is placed between the membrane and the anode end plate since lower temperatures are employed to dissociate the ammonia vapor. We found further that when we employ a supported catalyst material such material can be positioned between the membrane and the end plate but the membrane is spaced preferably from the anode in view of the higher temperature requirements for ammonia dissociation.

We found that we can position our improved catalyst material within the anode chamber of a fuel cell and spaced from the anode whereby ammonia vapor is supplied to the anode chamber, passed over the heated catalyst material and dissociated into constituent gases. Such heating may be accomplished in a variety of ways. However, we prefer to employ a resistance tube furnace surrounding the anode chamber of the fuel cell. We found that the dissociated gases or hydrogen gas diffused therefrom can be supplied to the anode whereby the fuel cell operates effectively. As the temperature of the catalyst is raised, the percentage of the dissociated gases increases whereby the gas content is 75% hydrogen, 25% nitrogen and a trace of ammonia. At lower temperatures, the amount of ammonia is greater in dissociated gases. When the ammonia content is higher, it is preferred to employ an alkaline electrolyte as opposed to an acid electrolyte.

Our improved fuel cell includes a cathode chamber, a cathode within the chamber, means for supplying an oxidant to the cathode chamber, an electrolyte, an anode chamber, an anode within the anode chamber, one surface of both the anode and cathode in contact with the electrolyte, means for supplying ammonia vapor to the anode fuel chamber, and the improved catalyst material of our invention positioned within the anode chamber and spaced preferably from the anode, and heating means for the anode chamber. A wide variety of cathode and anode electrodes may be employed in our invention. For example, cathode and anode electrode structures can be employed which are described and claimed in U.S. Letters Patent 3,297,484 issued Jan. 10, 1967, and assigned to the same assignee as the present application. These electrodes consist, for example, of 34 milligrams of platinum per square centimeter of active area bonded together by polytetrafluoroethylene. While the electrolyte described in the examples for use in our improved fuel cell is potassium hydroxide, many additional electrolytes may be employed which are suitable for fuel cell operation. Such electrolytes include ion exchange resin electrolytes of the type, for example, described and claimed in U.S. Letters Patent 3,134,697 issued May 26, 1964, and assigned to the same assignee as the present application. Additional electrolytes include molten carbonate structures, solutions of alkali-metal hydroxides, quaternary ammonium hydroxides, alkali-metal carbonates and acids, for example, $H_2SO_4$, $HClO_4$, aryl and alkyl sulfonic acids, etc. The fuel which we employ in our fuel cell is ammonia vapor which can be obtainable from various sources.

An illustrative operation of the fuel cell shown in FIG. 1 comprises supplying ammonia vapor from a suitable source (not shown) such as a tank with liquid ammonia into fuel inlet conduit 30 which is controlled by a suitable valve (not shown). Oxygen is admitted from a suitable source (not shown) into oxidant inlet conduit 27. Electrodes 11 and 12 are of the type set forth in the above-identified U.S. Letters Patent 3,297,484 containing 34 milligrams of platinum per square centimeter of active area bonded together by polytetrafluroroethylene. Catalyst material 32 is positioned in the anode chamber by a metal screen which is spaced from the anode. The catalyst material comprises an alumina support material on which is dispersed 4 weight percent iridium. The anode chamber of the fuel cell is positioned within the resistance tube furnace 34 which heats the catalyst to a temperature of 455° C. The electrolyte is a 54% solution of potassium hydroxide. The cell operates at a temperature of 110° C.

The ammonia vapor flows through conduit 30 and into contact with the catalyst material 32 whereby the ammonia vapor is dissociated into approximately 75% hydrogen, 25% nitrogen, and a slight trace of ammonia. These dissociated gases contact anode 11 whereby the hydrogen is the effective fuel for the cell. When the hydrogen fuel and oxygen oxidant are concurrently and separately supplied to the respective electrodes of the fuel cell, an electrical potential develops across the electrodes. This cell operated quite satisfactorily and its operation will be discussed below in connection with subsequent FIG. 3 of the drawing.

Examples of fuel cells which are made in accordance with our invention are set forth below:

EXAMPLES 1–3

A fuel cell is constructed in accordance with FIG. 1 of the drawing employing ammonia gas as the initial fuel and oxygen as the oxidant. The electrolyte is 54 weight percent potassium hydroxide while the electrodes contain 34 milligrams of platinum per square centimeter of active area bonded together with polytetrafluoroethylene. Catalyst material in the form of pellets with alumina support material and 4 weight percent iridium thereon are positioned in the anode chamber by a metal screen which is spaced from the anode. The anode chamber of the fuel cell is positioned within a resistance tube furnace to provide heat to the catalyst material. The cell is operated at a temperature of 110° C.

For purposes of comparing the present fuel cell of our invention with similarly constructed fuel cells employing ammonia and hydrogen fuels, respectively, and which do not employ the catalyst material or anode chamber heating means of the present invention, such fuel cells were constructed and operated. The electrodes, electrolytes, and operating temperature were identical.

Figure 3:
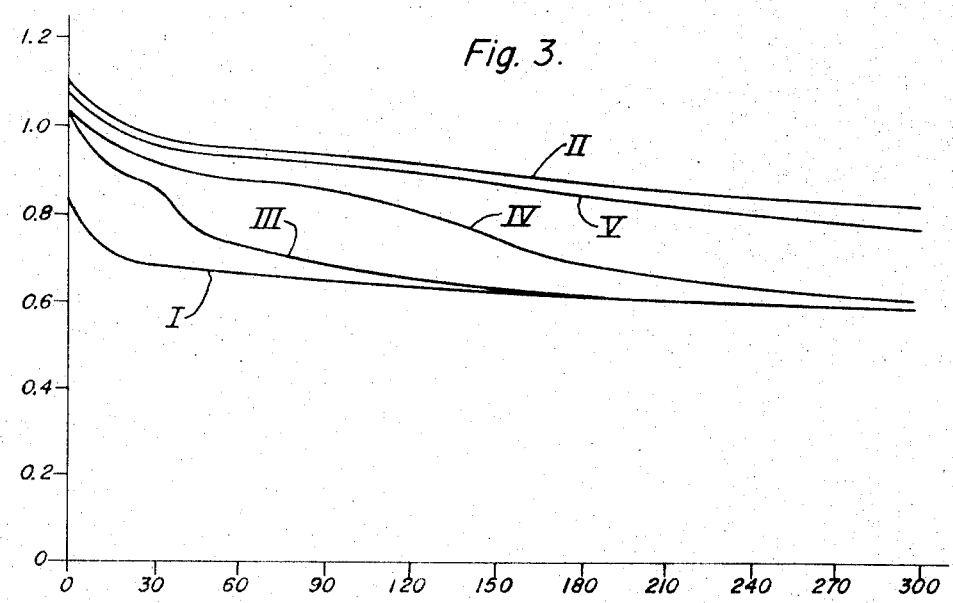
FIG. 3 is a graph comprising the performance of fuel cells operating with hydrogen, ammonia, and dissociated ammonia wherein current density in milliamperes per square centimeter is plotted against cell voltage (iR-free).

In FIG. 3 of the drawing there is shown a graph comparing the performance of fuel cells operated with hydrogen, ammonia and dissociated ammonia wherein current density in milliamperes per square centimeter were plotted against cell voltage (iR-free). Curve I in FIG. 3 shows the performance of the above type fuel cell when the fuel supplied to the cell was ammonia vapor. Curve II shows the employment of hydrogen fuel in such a fuel cell and the significant improvement in the performance of the fuel cell. Curves III, IV and V show the operation of a fuel cell which is made in accordance with our invention employing the catalyst material as described above. Curves III, IV and V show the operation of such a cell with initial ammonia vapor wherein the catalyst is heated to temperatures of 316° C., 360° C. and 450° C., respectively. When the catalyst is heated to a temperature of 455° C., the ammonia vapor is dissociated to provide a fuel which provides performance almost equivalent to that of pure hydrogen.

It will be appreciated that when a hydrogen diffusion membrane is positioned between the catalyst and the anode only hydrogen fuel will be supplied to the anode thereby providing a further improvement in the performance of the cell. However, even in the absence of such a hydrogen diffusion membrane the cell performs effectively and this performance increases as the temperature of the catalyst material is increased.

While other modifications of the invention and variations thereof which may be employed within the scope of this invention have not been described, the invention is intended to include such as may be embraced within the following claims.

What we claim as new and desire to secure by Letters Patent of the United States is:

1. In a fuel cell comprising a cathode chamber, a cathode within the chamber, means for supplying oxidant to the cathode chamber, an electrolyte, an anode chamber, an anode within the anode chamber, one surface of both the cathode and anode in contact with the electrolyte, and means for supplying ammonia vapor to the anode chamber, the combination therewith of additional catalyst material positioned separately within the anode chamber, the additional catalyst material selected from the class consisting of iridium and iridium alloys, a gas permeable spacer positioned between the additional catalyst material and the anode, and heating means for the anode chamber.

2. In a fuel cell as in claim 1, wherein the spacer is a hydrogen diffusion membrane.

3. In a method of generating electricity comprising supplying an oxidant to a cathode chamber of a fuel cell, supplying simultaneously ammonia vapor to the anode chamber, and contacting the anode and cathode with an electrolyte, the combination therewith of the steps of dissociating the ammonia vapor by contacting the ammonia vapor with an additional catalyst material selected from the class of iridium and iridium alloys, contacting the dissociated gases with a hydrogen permeable membrane thereby diffusing hydrogen gas therethrough, heating simultaneously the additional catalyst material, and supplying the hydrogen gas as fuel to the anode.

References Cited

UNITED STATES PATENTS

| | | | |
|---|---|---|---|
| 3,198,604 | 8/1965 | Pfefferle | 136—81 UX |
| 3,231,428 | 1/1966 | Thompson | 136—86 |
| 3,259,523 | 7/1966 | Faris, Jr. et al. | 136—86 |
| 3,296,025 | 1/1967 | Holt et al. | 136—86 X |
| 3,321,334 | 5/1967 | Palmer | 136—86 |
| 3,328,204 | 6/1967 | Grubb | 136—86 |
| 3,364,072 | 1/1968 | Barber | 136—86 |
| 3,393,098 | 7/1968 | Hartner et al. | 136—86 |

FOREIGN PATENTS

| | | | |
|---|---|---|---|
| 1,429,906 | 1/1966 | France | 136—86 |
| 1,028,325 | 5/1966 | Great Britain | 136—86 |

ALLEN B. CURTIS, Primary Examiner

U.S. Cl. X.R.

136—86 E